(12) United States Patent
Caceres et al.

(10) Patent No.: US 10,584,669 B2
(45) Date of Patent: Mar. 10, 2020

(54) FILTER ASSEMBLY FOR FUEL INJECTOR

(71) Applicant: Caterpillar Inc., Peoria, IL (US)

(72) Inventors: Diego Caceres, Dunlap, IL (US); Ramshankar Muthukumar, Chennai (IN)

(73) Assignee: Caterpillar Inc., Peoria, IL (US)

( * ) Notice: Subject to any disclaimer, the term of this patent is extended or adjusted under 35 U.S.C. 154(b) by 134 days.

(21) Appl. No.: 15/825,145

(22) Filed: Nov. 29, 2017

(65) Prior Publication Data

US 2019/0162147 A1    May 30, 2019

(51) Int. Cl.
| | | |
|---|---|---|
| F02M 61/16 | (2006.01) | |
| B01D 35/30 | (2006.01) | |
| B01D 35/00 | (2006.01) | |
| F02M 57/00 | (2006.01) | |

(52) U.S. Cl.
CPC ......... *F02M 61/165* (2013.01); *B01D 35/005* (2013.01); *B01D 35/306* (2013.01); *F02M 57/005* (2013.01); *F02M 61/168* (2013.01); *F02M 2200/248* (2013.01); *F02M 2200/27* (2013.01)

(58) Field of Classification Search
CPC .............. F02M 61/165; F02M 61/168; F02M 61/1853; F02M 61/186; F02M 59/46; F02M 59/462; F02M 59/466; F02M 2200/27; F02M 2200/248; F02M 57/005; A47J 31/20; B01D 35/005; B01D 35/306
See application file for complete search history.

(56) References Cited

U.S. PATENT DOCUMENTS

| | | | |
|---|---|---|---|
| 3,657,994 A * | 4/1972 | Post ......................... | A47J 31/20 99/323 |
| 5,820,754 A | 10/1998 | Cassidy et al. | |
| 6,161,773 A | 12/2000 | Camplin et al. | |
| 6,663,026 B2 | 12/2003 | McFarland | |
| 9,713,399 B2 * | 7/2017 | Boone ................... | A47J 31/005 |
| 2017/0009718 A1 | 1/2017 | Caceres | |
| 2019/0112900 A1 * | 4/2019 | Osunjaye ................ | E21B 34/14 |

FOREIGN PATENT DOCUMENTS

| | | |
|---|---|---|
| DE | 102009029667 | 3/2011 |
| DE | 102010041494 | 3/2012 |
| FR | 3028567 | 5/2016 |
| GB | 2009893 A * | 6/1979 ............... F01P 7/16 |

* cited by examiner

*Primary Examiner* — Terry K Cecil
(74) *Attorney, Agent, or Firm* — Harrity & Harrity LLP

(57) ABSTRACT

A filter assembly for a fuel injector is provided. The filter assembly includes a first ring. The first ring includes a plurality of first apertures provided along a circumference thereof. The filter assembly also includes a second ring disposed concentrically with respect to the first ring. The second ring includes a plurality of second apertures provided along a circumference thereof. Each of the plurality of second apertures is disposed misaligned with respect to each of the plurality of first apertures respectively. The filter assembly further includes an actuation mechanism operably coupled to the second ring. The actuation mechanism is adapted to selectively rotate the second ring about an axis with respect to the first ring to, at least partially, align each of the plurality of first apertures with respect to each of the plurality of second apertures respectively to provide an unfiltered flow of a fluid through the filter assembly.

20 Claims, 7 Drawing Sheets

FILTER ASSEMBLY FOR FUEL INJECTOR

TECHNICAL FIELD

The present disclosure relates to a filter assembly, and more particularly to the filter assembly for the injector of an internal combustion engine.

BACKGROUND

Generally, a fuel injector includes a body and a case joined together to accommodate multiple moving parts, such as a plunger and valve elements, to inject fuel into a cylinder of an internal combustion engine. A fluid may be circulated inside the fuel injector for operational, cooling and/or lubricating purpose. In many situations, the fluid flowing into the fuel injector may conduct debris into the fuel injector. This may result in a seizure of the fuel injector and premature failure of the moving parts of the fuel injector, thereby reducing operating performance of the internal combustion engine.

Hence, a filter may be employed at a fluid inlet of the fuel injector in order to limit entry of the debris into the fuel injector. However, at a low temperature of the fluid, a viscosity of the fluid may be relatively high such that the filter may limit the flow of the fluid into the fuel injector. As a result, the high viscosity of the fluid and resulting restrictive nature of the filter may affect a cold start of the internal combustion engine which may not be desirable. Hence, there is a need for an improved filter assembly for the fuel injector.

German Patent Application Number 102009029667 describes a filter including a front closure section and a bar-shaped filter section formed subsequent to a flow direction of a cleaning liquid. A rearward closure section is formed subsequent to the filter section. The filter section is arranged with a filter plate stretching in a longitudinal direction of the bar-shaped filter section through which the cleaning liquid is passed.

SUMMARY OF THE DISCLOSURE

In one aspect of the present disclosure, a filter assembly is provided. The filter assembly includes a first ring. The first ring includes a plurality of first apertures provided along a circumference thereof. The first ring defines an axis and a plane thereof. The filter assembly also includes a second ring disposed concentrically with respect to the first ring along the axis and the plane defined by the first ring. The second ring includes a plurality of second apertures provided along a circumference thereof. Each of the plurality of second apertures disposed is misaligned with respect to each of the plurality of first apertures respectively. The filter assembly further includes an actuation mechanism operably coupled to the second ring. The actuation mechanism is adapted to selectively rotate the second ring about the axis with respect to the first ring to, at least partially, align each of the plurality of first apertures with respect to each of the plurality of second apertures respectively to provide an unfiltered flow of a fluid through the filter assembly.

In another aspect of the present disclosure, a filter assembly is provided. The filter assembly includes a first ring. The first ring includes a plurality of first apertures provided along a circumference thereof. The first ring defines an axis and a plane thereof. The filter assembly also includes a second ring disposed concentrically with respect to the first ring along the axis and the plane defined by the first ring. The second ring includes a plurality of second apertures provided along a circumference thereof. Each of the plurality of second apertures disposed is misaligned with respect to each of the plurality of first apertures respectively. The filter assembly further includes an actuation mechanism operably coupled to the second ring. The filter assembly includes a temperature sensor provided in fluid communication with a fluid. The filter assembly further includes a controller communicably coupled to the temperature sensor and the actuation mechanism. The controller is configured to receive a signal indicative of a temperature of the fluid. The controller is also configured to actuate the actuation mechanism to rotate the second ring about the axis with respect to the first ring to, at least partially, align each of the plurality of first apertures with respect to each of the plurality of second apertures respectively to provide an unfiltered flow of the fluid through the filter assembly based, at least in part, on the temperature of the fluid.

In yet another aspect of present disclosure, a fuel injector is provided. The fuel injector includes a case and a body coupled to the case. The fuel injector also includes a nozzle provided on the case. The fuel injector further includes a filter assembly disposed in association with the case. The filter assembly includes a first ring. The first ring includes a plurality of first apertures provided along a circumference thereof. The first ring defines an axis and a plane thereof. The filter assembly also includes a second ring disposed concentrically with respect to the first ring along the axis and the plane defined by the first ring. The second ring includes a plurality of second apertures provided along a circumference thereof. Each of the plurality of second apertures disposed is misaligned with respect to each of the plurality of first apertures respectively. The filter assembly further includes an actuation mechanism operably coupled to the second ring. The filter assembly includes a temperature sensor provided in fluid communication with a fluid. The filter assembly further includes a controller communicably coupled to the temperature sensor and the actuation mechanism. The controller is configured to receive a signal indicative of a temperature of the fluid. The controller is also configured to actuate the actuation mechanism to rotate the second ring about the axis with respect to the first ring to, at least partially, align each of the plurality of first apertures with respect to each of the plurality of second apertures respectively to provide an unfiltered flow of the fluid through the filter assembly based, at least in part, on the temperature of the fluid.

Other features and aspects of this disclosure will be apparent from the following description and the accompanying drawings.

DETAILED DESCRIPTION

Figure 1:
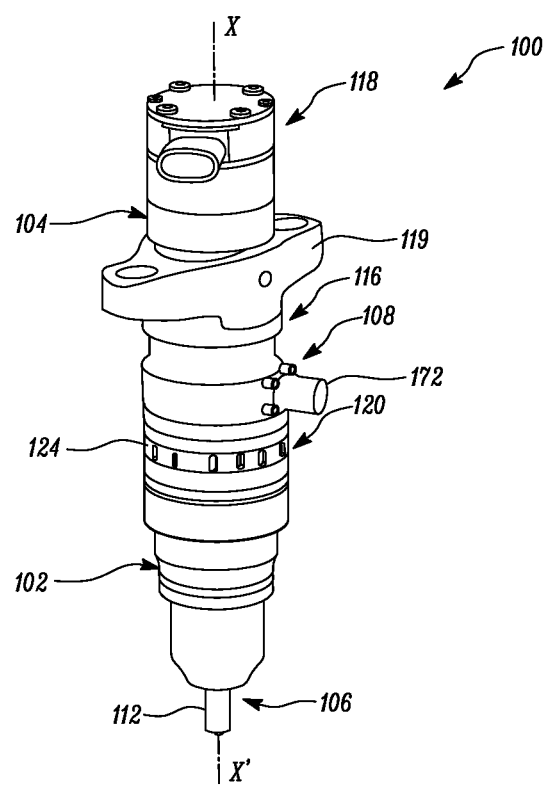
FIG. 1 is a perspective view of a fuel injector, according to one embodiment of the present disclosure.

Wherever possible, the same reference numbers will be used throughout the drawings to refer to the same or the like parts. Also, corresponding or similar reference numbers will be used throughout the drawings to refer to the same or corresponding parts. Referring to FIG. 1, an exemplary fuel injector 100 is illustrated. In the illustrated embodiment, the fuel injector 100 is a hydraulically actuated fuel injector. The fuel injector 100 is adapted to inject a fuel into a cylinder (not shown) of an engine (not shown) during a combustion process.

The fuel injector 100 is adapted to be fluidly coupled to a fuel supply system (not shown) of the engine. The fuel supply system is adapted to supply the fuel to the fuel injector 100. The fuel injector 100 is also adapted to be fluidly coupled to a hydraulic system (not shown) of the engine. The hydraulic system is adapted to supply a pressurized fluid to the fuel injector 100 for operational purpose, such as for actuating a plunger (not shown) of the fuel injector 100. Accordingly, the fuel injector 100 may inject or spray the fuel into the cylinder of the engine.

The fuel injector 100 is mounted on a cylinder head (not shown) of the engine. More specifically, the fuel injector 100 is positioned in a bore (not shown) provided within the cylinder head of the engine. Multiple fluid passages (not shown) may be defined in the cylinder head in association with the bore. Further, the multiple fluid passages may be in fluid communication with the fuel injector 100. One or more of the multiple fluid passages may supply the fuel from the fuel supply system to the fuel injector 100. Also, one or more of the multiple fluid passages may supply the fluid from the hydraulic system to the fuel injector 100.

Figure 2:
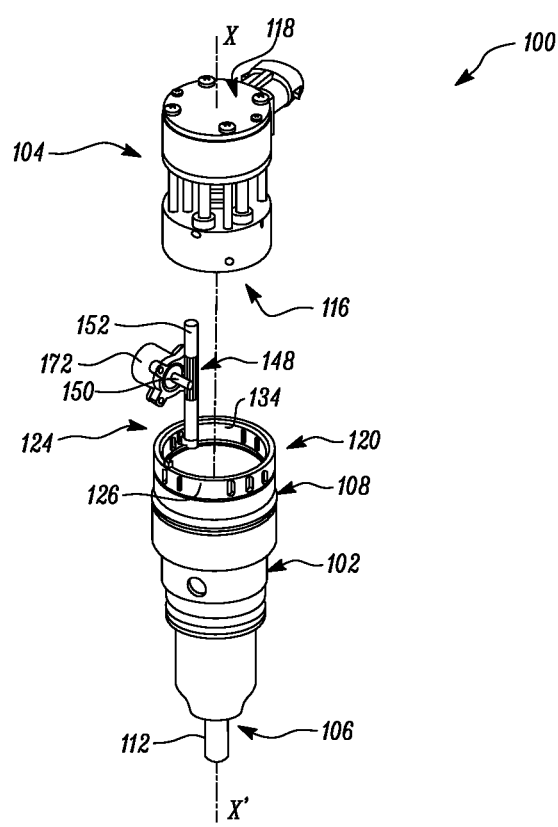
FIG. 2 is a partial exploded view of the fuel injector of FIG. 1 showing a filter assembly therein, according to one embodiment of the present disclosure.

Referring to FIGS. 1 and 2, the fuel injector 100 includes a case 102 and a body 104. The body 104 is coaxially positioned along a longitudinal axis X-X' and adapted to be coupled to the case 102. The case 102 includes a first end 106 and a second end 108. The first end 106 is adapted to be received within the bore of the cylinder head. The first end 106 also includes a nozzle 112 provided thereon. The second end 108 is adapted to be coupled to the body 104. The case 102 is adapted to receive one or more components therein including, but not limited to, a plunger assembly and a needle valve assembly. The plunger assembly and the needle valve assembly are adapted to spray the fuel through the nozzle 112 of the fuel injector 100.

The body 104 also includes a first end 116 and a second end 118. The first end 116 is adapted to be coupled to the second end 108 of the case 102. In the illustrated embodiment, the first end 116 of the body 104 is threadably coupled to the second end 108 of the case 102. In other embodiments, the first end 116 of the body 104 may be coupled to the second end 108 of the case 102 using any other coupling method known in the art. The body 104 is adapted to receive one or more components therein including, but not limited to, a hydraulic actuator unit (not shown). The body 104 also includes a connector 119 coupled thereto. The connector 119 is adapted to couple the fuel injector 100 to the cylinder head.

The fuel injector 100 also includes a filter assembly 124 provided on the case 102. More specifically, the filter assembly 124 is provided in association with a fluid inlet 120 provided on the case 102. The fluid inlet 120 is adapted to receive the fluid from the hydraulic system. The filter assembly 124 is adapted to filter the fluid entering through the fluid inlet 120. The filter assembly 124 is disposed circumferentially between the first end 106 and the second end 108 of the case 102. The filter assembly 124 will now be explained with reference to FIGS. 2 and 3.

Figure 3:
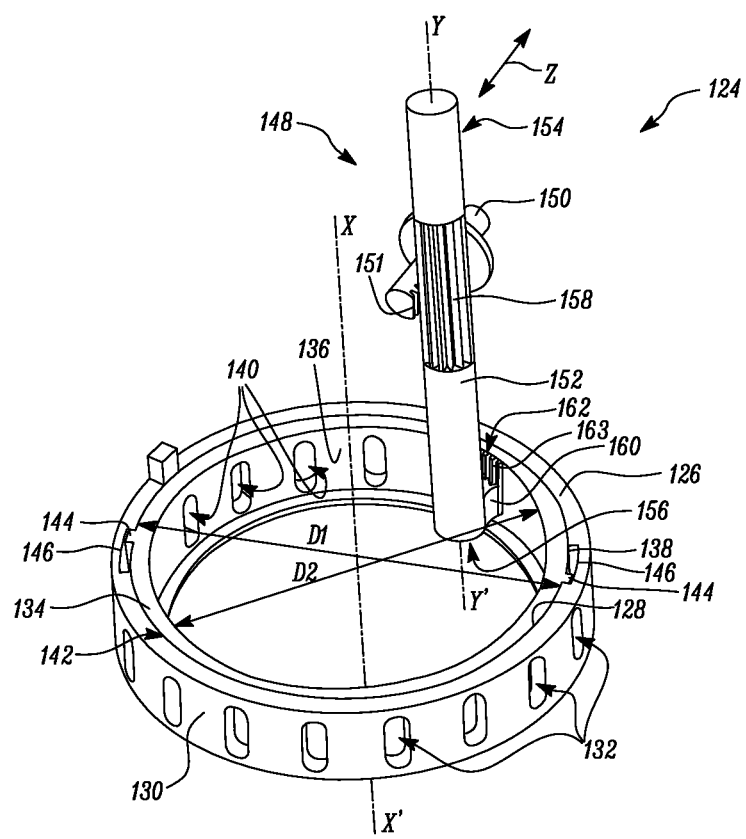
FIG. 3 is a perspective view of the filter assembly of FIG. 2, according to one embodiment of the present disclosure.

Referring to FIGS. 2 and 3, the filter assembly 124 includes a first ring 126 defining the longitudinal axis X-X', a plane (not shown), and a diameter "D1" thereof. The first ring 126 includes an inner surface 128 and an outer surface 130 opposite to the inner surface 128. The first ring 126 includes multiple first apertures 132 provided along a circumference thereof. Each of the first apertures 132 is disposed spaced apart with respect to one another. Also, each of the first apertures 132 is equidistant with respect to one another. Each of the first apertures 132 extend between the inner surface 128 and the outer surface 130 of the first ring 126. In the illustrated embodiment, each of the first apertures 132 include a substantially elongated and curved configuration. In other embodiments, each of the first apertures 132 may include any other configuration, such as circular, elliptical, rectangular, and so on.

The filter assembly 130 also includes a second ring 134. The second ring 134 is disposed concentrically with respect to the first ring 126 along the longitudinal axis X-X' and the plane defined by the first ring 126. The second ring 134 defines a diameter "D2" thereof. The diameter "D2" of the second ring 134 is less than the diameter "D1" of the first ring 126. Accordingly, a clearance 142 is provided between the first ring 126 and the second ring 134. An actual size of the clearance 142 may differ based on the diameters "D1", "D2" of the first and second rings 126, 134 respectively.

The second ring 134 includes an inner surface 136 and an outer surface 138 opposite to the inner surface 136. The outer surface 138 is disposed spaced apart and adjacent with respect to the inner surface 128 of the first ring 126. The second ring 134 includes multiple second apertures 140 provided along a circumference thereof. Each of the second apertures 140 is disposed spaced apart with respect to one another. Also, each of the second apertures 140 is equidistant with respect to one another. Each of the second apertures 140 extend between the inner surface 136 and the outer surface 138. In the illustrated embodiment, each of the second apertures 140 include a substantially elongated and curved configuration. In other embodiments, each of the second apertures 140 may include any other configuration, such as circular, elliptical, rectangular, and so on. Also, each of the second apertures 140 is disposed misaligned with respect to each of the first apertures 132 respectively.

In some embodiments, the second ring 134 may also include multiple orifices (not shown) provided along the circumference thereof. Each of the orifices may be provided spaced apart with respect to one another and each of the second apertures 140. Also, each of the orifices may extend between the inner surface 136 and the outer surface 138 of the second ring 134. Each of the orifices may be manufactured using any process known in the art, such as machining, laser drilling, and so on.

Each of the first and second ring 126, 134 is disposed in association with the fluid inlet 120 of the fuel injector 100. The fluid entering the fluid inlet 120 flows through each of the first apertures 132 of the first ring 126 and further through the clearance 142 provided between the first ring 126 and the second ring 134. The clearance 142 is adapted to provide a filtering medium for the flow of the fluid. Accordingly, the fluid is filtered during the flow through the clearance 142 and enters the case 102 of the fuel injector 100 via each of the second apertures 140 of the second ring 134.

As illustrated in FIG. 3, the second ring 134 may include one or more tabs 144 extending radially outward from the outer surface 138 of the second ring 134. Further, the first ring 126 may include one or more recesses 146 provided on the inner surface 128 in association with the tabs 144. The recesses 146 are adapted to receive the respective tabs 144 therein. A size of the recesses 146 is substantially greater than a size of the respective tabs 144. Accordingly, the recesses 146 may provide a limited movement of the respective tabs 144 therein, in turn, providing limited rotation of the second ring 134 about the longitudinal axis X-X' relative to the first ring 126. Alternatively, in some embodiments, location of the one or more tabs and the respective one or more recesses may be interchanged, such that the first ring 126 may include the tab radially extending from the inner surface 128 thereof and the respective recess may be provided on the outer surface 138 of the second ring 134, based on application requirements.

The filter assembly 124 further includes an actuation mechanism 148. The actuation mechanism 148 is operably coupled to the second ring 134. The actuation mechanism 148 is adapted to selectively rotate the second ring 134 about the longitudinal axis X-X' with respect to the first ring 126 to align each of the first apertures 132 with respect to each of the second apertures 140 respectively to provide an unfiltered flow of the fluid through the first and second ring 126, 134.

As shown in FIG. 3, the actuation mechanism 148 includes a rack 150 adapted to translate in a linear direction "Z". The rack 150 includes multiple teeth 151 provided on a circumference thereof. The rack 150 is positioned substantially perpendicular to the longitudinal axis X-X'. The rack 150 may be disposed within an aperture (not shown) provided in the case 102 of the fuel injector 100. The actuation mechanism 148 also includes a shaft 152. The shaft 152 is disposed within the case 102 of the fuel injector 100 substantially parallel with respect to the longitudinal axis X-X'. Accordingly, a passage (not shown) may be provided within the case 102 for receiving the shaft 152 therein.

The shaft 152 includes a first end 154 and a second end 156 disposed opposite the first end 154. The first end 154 of the shaft 152 is operably coupled to the rack 150. More particularly, the first end 154 of the shaft 152 includes multiple teeth 158 provided thereon. The shaft 152 is positioned substantially perpendicular with respect to the rack 150, such that the teeth 158 of the shaft 152 are engaged with the teeth 151 of the rack 150. Further, the shaft 152 is adapted to, at least partially, rotate about a longitudinal axis Y-Y' based on the translation of the rack 150. The actuation mechanism 148 also includes a gear element 160 fixedly coupled to the second end 156 of the shaft 152. The gear element 160 is adapted to be operably coupled to the second ring 134. The gear element 160 may be disposed within a cut section (not shown) provided on the case 102.

The inner surface 136 of the second ring 134 includes a gear engaging portion 162. The gear engaging portion 162 is adapted to engage with the gear element 160 in order to operably couple the second ring 134 with respect to the gear element 160. The gear engaging portion 162 includes multiple teeth 163 adapted to engage with the gear element 160. The gear element 160 is adapted to transfer the rotation of the shaft 152 to the second ring 134. More particularly, the rotation of the shaft 152 provides rotation to the gear element 160 about the longitudinal axis Y-Y'. The rotation of the gear element 160, in turn, provides the rotation to the second ring 134. The filter assembly 124 is adapted to provide the unfiltered flow of the fluid and the filtered flow of the fluid to the fuel injector 100 based on a position of the second ring 134 with respect to a position of the first ring 126. The filtered and unfiltered flow of the fluid provided by the filter assembly will now be explained in detail with reference to FIGS. 4 and 5.

Figure 4:
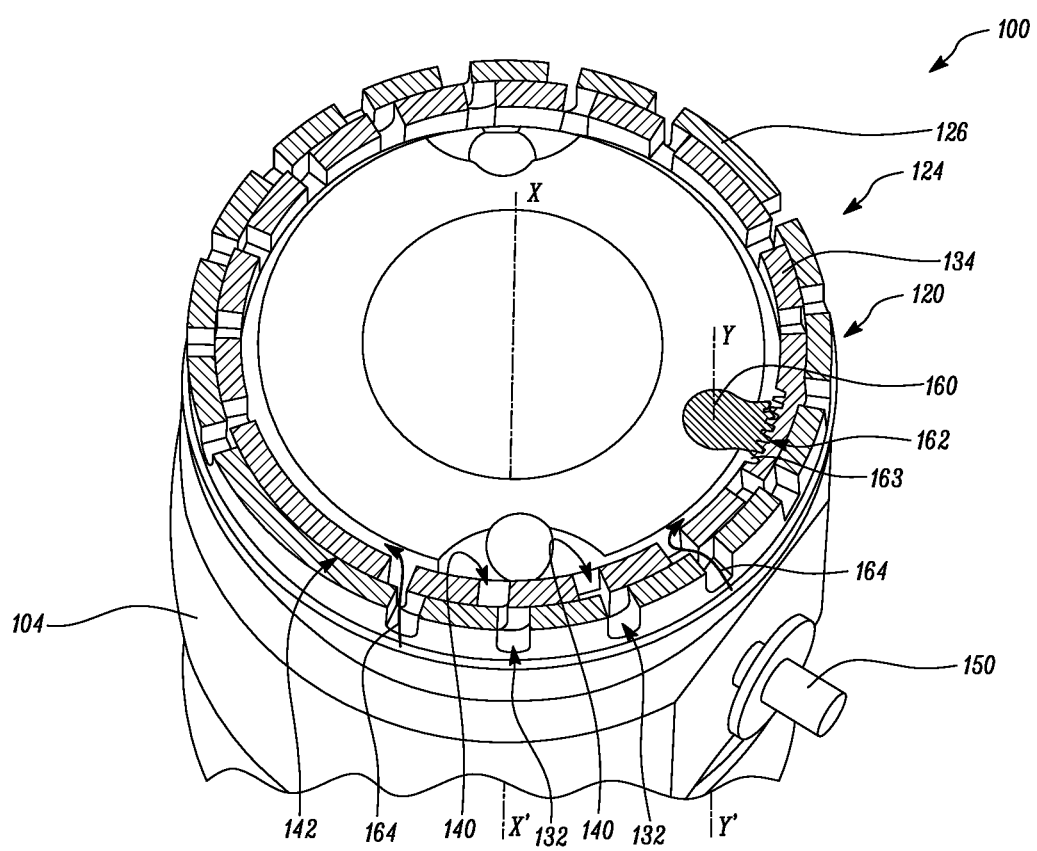
FIG. 4 is a perspective cross sectional view of the fuel injector of FIG. 1, according to one embodiment of the present disclosure.

Referring to FIG. 4, the position of each of the first and second ring 126, 134 of the filter assembly 124 for providing the unfiltered flow of the fluid is illustrated. The actuation mechanism 148 of the filter assembly 124 is adapted to selectively rotate the second ring 134 about the longitudinal axis X-X' with respect to the first ring 126. More particularly, the translation of the rack 150 renders the rotation of the shaft 152 and the gear element 160. Accordingly, the second ring 134 rotates due to the rotation of the gear element 160 along with the shaft 152.

The rotation of the second ring 134 aligns each of the first apertures 132 with respect to each of the second apertures 140 respectively. Accordingly, each of the first and second ring 126, 134 is aligned with respect to each other to provide the unfiltered flow of the fluid through the filter assembly 124. More specifically, the fluid entering via the fluid inlet 120 flows through a path 164 defined by aligning of each of the first apertures 132 with respect to each of the second apertures 140 in order to provide the unfiltered flow of the fluid.

Figure 5:
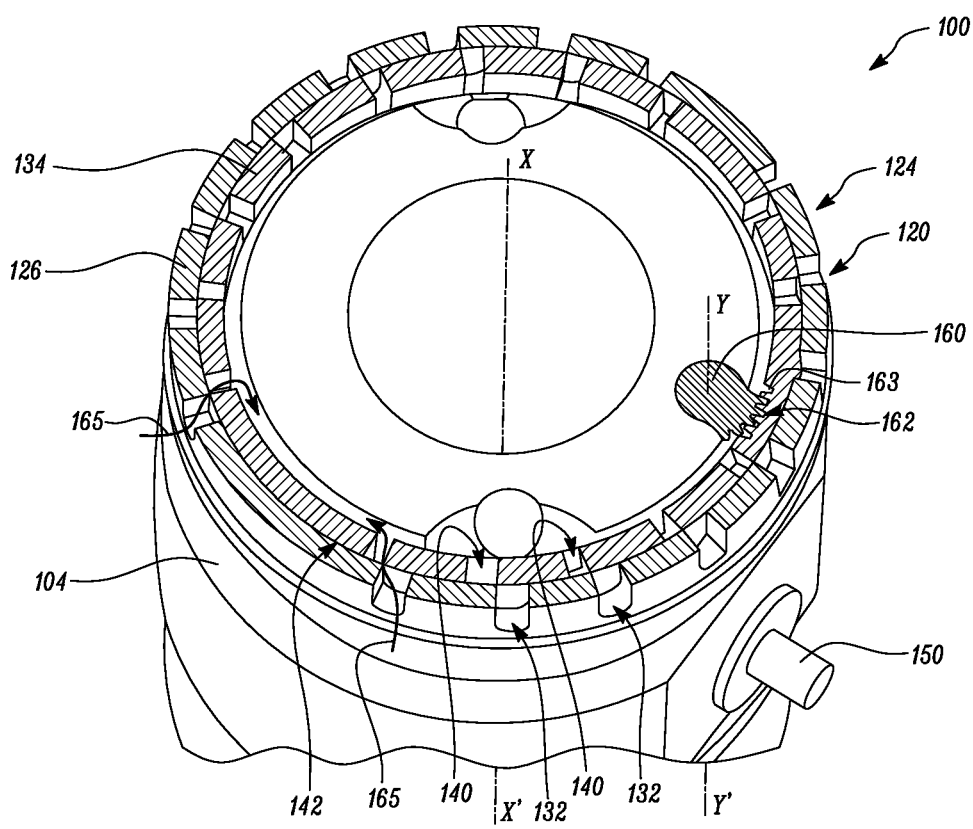
FIG. 5 is another perspective cross sectional view of the fuel injector of FIG. 1, according to one embodiment of the present disclosure.

Referring to FIG. 5, the position of each of the first and second ring 126, 134 of the filter assembly 124 for providing the filtered flow of the fluid is illustrated. Each of the first and second apertures 132, 140 of each of the first and second ring 126, 134 respectively is misaligned. Each of the first apertures 132 of the first ring 126 is adapted to receive the flow of the fluid from the fluid inlet 120. Further, the flow of the fluid received by each of the first apertures 132 is directed towards the clearance 142 provided between the first ring 126 and the second ring 134.

Suspended particles present in the fluid are filtered while the fluid flows through the clearance 142. Further, the filtered fluid is directed to each of the second apertures 140 through the clearance 142 and enters the fuel injector 100. Accordingly, the fluid entering via the fluid inlet 120 flows through a path 165 via each of the first apertures 132, the clearance 142, and each of the second apertures 140. In a situation when the second ring 134 may include the orifices, the fluid received by each of the first apertures 132 may also flow and/or be filtered by the orifices. Thus, entry of debris and/or foreign particles present in the fluid into the fuel injector 100 may be limited.

Figure 6:
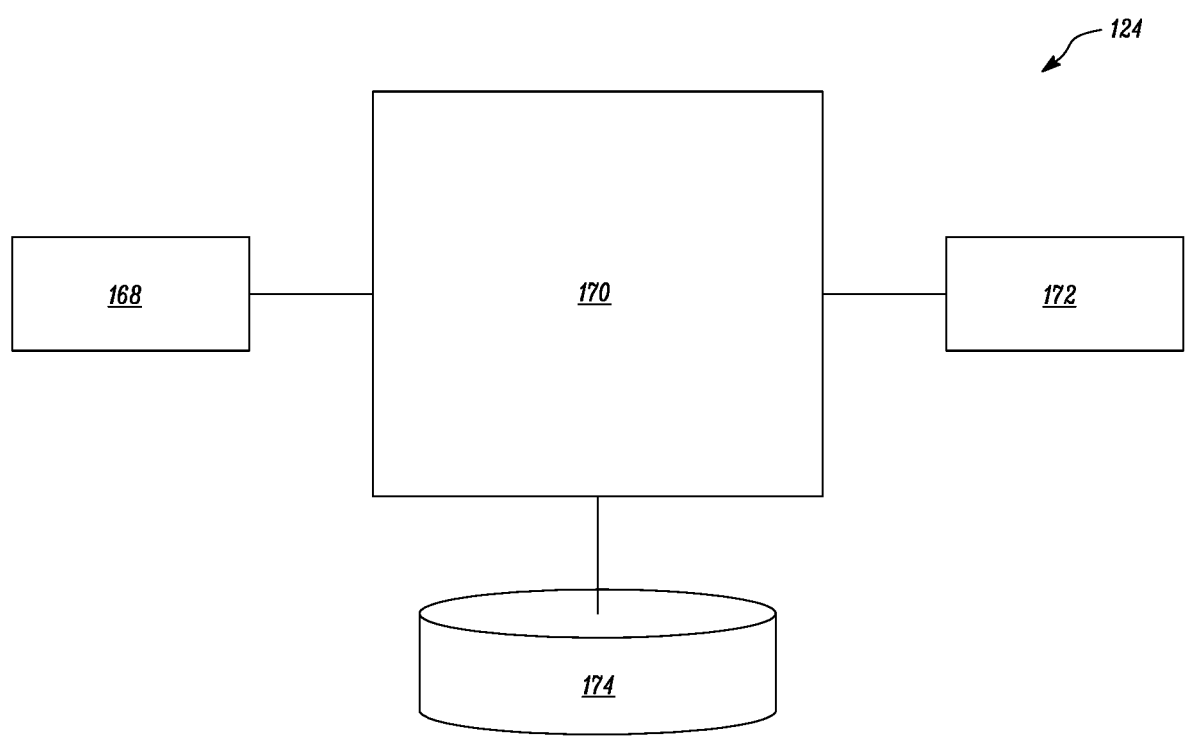
FIG. 6 is a schematic representation of the filter assembly of FIG. 2, according to one embodiment of the present disclosure.
Figure 7:
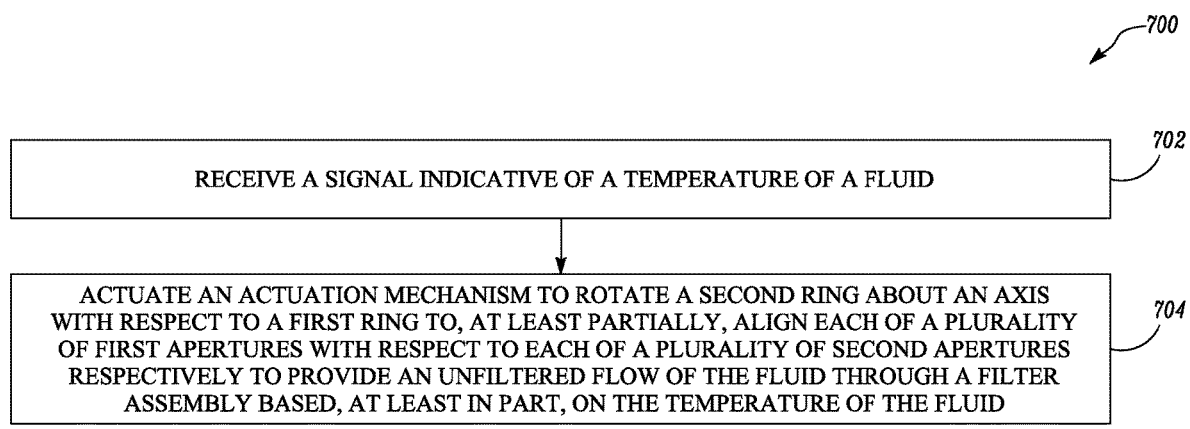
FIG. 7 is a flowchart illustrating a method of working of the filter assembly of FIG. 2, according to one embodiment of the present disclosure.

Referring to FIG. 6, a block diagram of the filter assembly 124 is illustrated. The filter assembly 124 further includes a temperature sensor 168. In one embodiment, the temperature sensor 168 may be operably coupled to a fluid reservoir (not shown). In another embodiment, the temperature sensor 168 may be disposed in association with the fluid inlet 120, or any other location based on application requirements. The temperature sensor 168 is configured to generate a signal indicative of a temperature of the fluid entering the fuel injector 100 via the fluid inlet 120. The temperature sensor 168 may be any temperature sensor known in the art configured to generate the signal indicative of the temperature of the fluid.

The filter assembly 124 further includes a solenoid 172 (shown in FIG. 1). The solenoid 172 is operably coupled to the rack 150 of the actuation mechanism 148. In other embodiments, the solenoid 172 may be any other actuator known in the art. The solenoid 172 is configured to provide the translation of the rack 150 based on an operation thereof. The filter assembly 124 also includes a controller 170. The controller 170 may be any control unit known in the art.

In one embodiment, the controller 170 may be a dedicated control unit configured to perform functions related to the fuel injector 100. In another embodiment, the controller 170 may be a Machine Control Unit (MCU) associated with a machine in which the fuel injector 100 may be employed, an Engine Control Unit (ECU) associated with the engine associated with the fuel injector 100, the use of which may be known in the art. The controller 170 may typically include processing means such as a microcontroller or a microprocessor, a governor such as a proportional integral derivative (PID) controller for regulating various parameters of the fuel injector 100 including, but not limited to, rate of fuel injection, and solenoid actuation. The controller 170 may be associated with a memory (not shown). The memory may be connected to the microcontroller or the microprocessor and may store instruction sets, maps, lookup tables, variables, and so on.

The controller 170 is communicably coupled to the temperature sensor 168 and the solenoid 172. Accordingly, the controller 170 is configured to receive the signal from the temperature sensor 168 indicative of the temperature of the fluid. Based on the received signal, the controller 170 may determine if the temperature of the fluid is below or exceeds a threshold. The threshold may be defined based on one or more parameters of the fluid, such as a type of the fluid, the amount of fluid required by the fuel injector 100, and so on. Accordingly, the controller 170 is configured to generate control signals for operation of the solenoid 172 based on the temperature of the fluid.

Based on the operation of the solenoid 172, the rack 150 of the actuation mechanism 148 is adapted to translate in the linear direction "Z". Accordingly, the second ring 134 rotates about the longitudinal axis X-X' with respect to the first ring 126 due to the rotation of the shaft 152 and the gear element 160 about the longitudinal axis Y-Y'. As such, each of the first apertures 132 align with respect to each of the second apertures 140 respectively to provide the unfiltered flow of the fluid through the filter assembly 124 via the path 164 based on the temperature of the fluid dropping below the threshold.

In one embodiment, the controller 170 is configured to actuate the actuation mechanism 148 for a predefined amount of time. In one example, the predefined amount of time may be defined based on one or more parameters of the fluid, such as the type of fluid, the amount of the fluid required by the fuel injector 100, the temperature of the fluid, and so on. Accordingly, the actuation mechanism 148 may provide the unfiltered flow of the fluid for the predefined amount of time.

The controller 170 is further communicably coupled to a database 174. The database 174 may include one or more software and/or hardware components that may cooperate to store, organize, sort, filter, and/or arrange data used by the controller 170. For example, the database 174 may include one or more predetermined threshold levels associated with current maximum and minimum temperature associated with various operational states of the solenoid 172.

The database 174 may include, but not limited to, different values of the temperature of the fluid, the actuation of the solenoid 172 corresponding to each temperature values of the fluid, an amount of current required to actuate the solenoid 172 at various temperature values of the fluid, a threshold value of the temperature to actuate the solenoid 172 to provide at least one of the filtered and unfiltered flows of the fluid, and so on. The controller 170 may access the information stored in the database 174 to determine actuation of the solenoid 172. It is contemplated that the database 174 may store additional and/or different information than that listed above, based on application requirements.

INDUSTRIAL APPLICABILITY

The present disclosure relates to the filter assembly 124 associated with the fuel injector 100. The filter assembly 124 includes the first ring 126, the second ring 134, and the actuation mechanism 148 to provide the filtered flow of fluid to the fuel injector 100. The first and second rings 126, 134 include the first and second apertures 132, 140 respectively. Each of the second apertures 140 are disposed misaligned with respect to each of the first apertures 132 respectively based on the temperature of the fluid exceeding the threshold. The clearance 142 between the first ring 126 and the second ring 134 provides the filtering medium and limits entry of the suspended particles present in the fluid into the fuel injector 100. The suspended particles present in the fluid may be filtered as the fluid flows through the path 165.

The actuation mechanism 148 includes the solenoid 172 and the temperature sensor 168. The temperature sensor 168 detects the temperature of the fluid and actuates the solenoid 172 based on the temperature detected by the temperature sensor 168. The solenoid 172 provides movement of the actuation mechanism 148 of the filter assembly 124. The actuation mechanism 148 rotates the second ring 134 about the longitudinal axis X-X' with respect to the first ring 126 to align each of the first apertures 132 with respect to each of the second apertures 140 respectively to provide the unfiltered flow of the fluid through the filter assembly 124 based on the temperature of the fluid dropping below the threshold. Accordingly, the flow of the fluid may be regulated at different temperatures effectively. Further, the second ring 134 may include the orifices to provide enhanced flow and/or filtering of the fluid therethrough in association with the clearance 142 and each of the first apertures 132.

FIG. 6 illustrates a flowchart of a method 700 of working of the filter assembly 124 based on the temperature of the fluid. The filter assembly 124 includes the controller 170 communicably coupled to the temperature sensor 168 and the solenoid 172. At step 702, the controller 170 receives the signal indicative of the temperature of the fluid from the temperature sensor 168. Based on the received signal, the controller 170 may determine if the temperature of the fluid is below or exceeds the threshold.

At step 704, the controller 170 actuates the actuation mechanism 148 to rotate the second ring 134 about the longitudinal axis X-X' with respect to the first ring 126 based on the temperature of the fluid. More particularly, the controller 170 actuates the solenoid 172 associated with the rack 150 of the actuation mechanism 148 in order to rotate the second ring 134 with respect to the first ring 126. In a situation when the temperature of the fluid drops below the threshold, the actuation mechanism 148 aligns each of the first apertures 132 with respect to each of the second apertures 140 respectively to provide the unfiltered flow of the fluid through the filter assembly via the path 164. Alternatively, when the temperature of the fluid exceeds the threshold, the controller 170 actuates the solenoid 172 to misalign each of the first apertures 132 with respect to each of the second apertures 140 respectively to provide the filtered flow of the fluid through the filter assembly 124 via the path 165.

The filter assembly 124 provides a simple, efficient, and cost effective method for regulating the flow of the fluid therethrough based on the temperature of the fluid. As such, the fluid may be filtered based on the misaligned position of the first ring 126 and the second ring 134 during relatively higher temperature of the fluid. Also, the fluid may flow unfiltered based on the aligned position of the first ring 126 and the second ring 134 during relatively lower temperature of the fluid, thus, providing improved flow of the fluid to the fuel injector 100 during a cold engine start. The filter assembly 124 may be retrofitted in any fuel injector 100 with little or no modification to the existing system.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof

What is claimed is:

1. A fuel system comprising:
a fluid inlet for fluidly coupling to a fuel supply system;
a nozzle for delivering sprayed fuel to an engine; and
a filter assembly comprising:
a first ring including a plurality of first apertures provided along a circumference thereof,
the first ring defining an axis and a plane thereof;
a second ring disposed concentrically with respect to the first ring along the axis and the plane defined by the first ring,
the second ring including a plurality of second apertures provided along a circumference thereof, each of the plurality of second apertures being disposed misaligned with respect to each of the plurality of first apertures respectively; and
an actuation mechanism operably coupled to the second ring,
the actuation mechanism being adapted to selectively rotate the second ring about the axis with respect to the first ring to, at least partially, align each of the plurality of first apertures with respect to each of the plurality of second apertures respectively to provide an unfiltered flow of a fluid through the filter assembly.

2. The fuel system of claim 1, wherein the actuation mechanism includes:
a rack adapted to translate in a linear direction;
a shaft operably coupled to the rack, the shaft adapted to, at least partially, rotate about a longitudinal axis thereof based on the translation of the rack; and
a gear element fixedly coupled to the shaft and operably coupled to the second ring,
the gear element being adapted to transfer the rotation of the shaft to the second ring.

3. The fuel system of claim 2, wherein the second ring further includes a gear engaging portion provided on the second ring,
the gear engaging portion being adapted to operably couple the second ring to the gear element.

4. The fuel system of claim 1, wherein the second ring further includes a plurality of orifices provided in association with the plurality of second apertures.

5. The fuel system of claim 1, wherein the filter assembly further comprises:
at least one recess provided on the first ring; and
at least one tab extending from the second ring,
the at least one tab being adapted to interconnect with respect to the at least one recess.

6. The fuel system of claim 1, wherein:
each of the plurality of first apertures is adapted to receive a flow of the fluid into the filter assembly, and
each of the plurality of second apertures is adapted to allow the flow of the fluid from the filter assembly.

7. The fuel system of claim 1, wherein the filter assembly further comprises:
a clearance provided between the first ring and the second ring,
the clearance being adapted to receive a filtering medium.

8. A fuel system comprising:
a filter assembly comprising:
a first ring including a plurality of first apertures provided along a circumference thereof, the first ring defining an axis and a plane thereof;
a second ring disposed concentrically with respect to the first ring along the axis and the plane defined by the first ring, the second ring including a plurality of second apertures provided along a circumference thereof, each of the plurality of second apertures disposed misaligned with respect to each of the plurality of first apertures respectively;
an actuation mechanism operably coupled to the second ring;
a temperature sensor provided in fluid communication with a fluid; and
a controller communicably coupled to the temperature sensor and the actuation mechanism,
the controller being configured to:
receive a signal indicative of a temperature of the fluid; and
actuate the actuation mechanism to rotate the second ring about the axis with respect to the first ring to, at least partially, align each of the plurality of first apertures with respect to each of the plurality of second apertures respectively to provide an unfiltered flow of the fluid through the filter assembly based, at least in part, on the temperature of the fluid;
a nozzle for delivering fuel to an engine; and
one or more components to spray the fuel through the nozzle.

9. The fuel system of claim 8, wherein the controller is further configured to:
actuate the actuation mechanism to rotate the second ring about the axis with respect to the first ring to, at least partially, misalign each of the plurality of first apertures with respect to each of the plurality of second apertures respectively to provide a filtered flow of the fluid through the filter assembly based, at least in part, on the temperature of the fluid.

10. The fuel system of claim 8, wherein the controller is further configured to actuate the actuation mechanism for a predefined amount of time.

11. The fuel system of claim 8, wherein the actuation mechanism further comprises:
a solenoid communicably coupled to the controller;

a rack operably coupled to the solenoid, the rack adapted to translate in a linear direction based on an actuation of the solenoid;

a shaft operably coupled to the rack, the shaft adapted to, at least partially, rotate about a longitudinal axis thereof based on the translation of the rack; and a gear element fixedly coupled to the shaft and operably coupled to the second ring, the gear element adapted to transfer the rotation of the shaft to the second ring.

12. The fuel system of claim 11, wherein the second ring further includes a gear engaging portion provided on the second ring, the gear engaging portion adapted to operably couple the second ring to the gear element.

13. The fuel system of claim 8, wherein the filter assembly further comprises:

at least one recess provided on the first ring; and at least one tab extending from the second ring, the at least one tab adapted to interconnect with respect to the at least one recess.

14. The fuel system of claim 8, wherein the filter assembly further comprises:

a clearance provided between the first ring and the second ring, the clearance adapted to receive a filtering medium.

15. A fuel injector comprising:

a case;

a body coupled to the case;

a nozzle provided on the case;

a filter assembly disposed in association with the case, the filter assembly including:

a first ring including a plurality of first apertures provided along a circumference thereof, the first ring defining an axis and a plane thereof;

a second ring disposed concentrically with respect to the first ring along the axis and the plane defined by the first ring, the second ring including a plurality of second apertures provided along a circumference thereof, each of the plurality of second apertures disposed misaligned with respect to each of the plurality of first apertures respectively;

an actuation mechanism operably coupled to the second ring;

a temperature sensor provided in fluid communication with a fluid; and a controller communicably coupled to the temperature sensor and the actuation mechanism, the controller being configured to:

receive a signal indicative of a temperature of the fluid; and actuate the actuation mechanism to rotate the second ring about the axis with respect to the first ring to, at least partially, align each of the plurality of first apertures with respect to each of the plurality of second apertures respectively to provide an unfiltered flow of the fluid through the filter assembly to the body based, at least in part, on the temperature of the fluid; and one or more components to spray fuel through the nozzle.

16. The fuel injector of claim 15, wherein the controller is further configured to:

actuate the actuation mechanism to rotate the second ring about the axis with respect to the first ring to, at least partially, misalign each of the plurality of first apertures with respect to each of the plurality of second apertures respectively to provide a filtered flow of the fluid through the filter assembly based, at least in part, on the temperature of the fluid.

17. The fuel injector of claim 15, wherein the controller is further configured to actuate the actuation mechanism for a predefined amount of time.

18. The fuel injector of claim 15, wherein the actuation mechanism further comprises:

a solenoid communicably coupled to the controller;

a rack operably coupled to the solenoid, the rack adapted to translate in a linear direction based on an actuation of the solenoid;

a shaft operably coupled to the rack, the shaft adapted to, at least partially, rotate about a longitudinal axis thereof based on the translation of the rack; and a gear element fixedly coupled to the shaft and operably coupled to the second ring, the gear element adapted to transfer the rotation of the shaft to the second ring.

19. The fuel injector of claim 18, wherein the second ring further comprises a gear engaging portion provided on the second ring, the gear engaging portion being adapted to operably couple the second ring to the gear element.

20. The fuel injector of claim 15, further comprising:

a clearance provided between the first ring and the second ring, the clearance being adapted to receive a filtering medium.

* * * * *